United States Patent
Parsons et al.

(10) Patent No.: US 10,705,341 B1
(45) Date of Patent: Jul. 7, 2020

(54) TEMPORALLY INCOHERENT AND SPATIALLY COHERENT SOURCE FOR WAVEGUIDE DISPLAYS

(71) Applicant: Facebook Technologies, LLC, Menlo Park, CA (US)

(72) Inventors: Maxwell Parsons, Seattle, WA (US); Wanli Chi, Sammamish, WA (US); Yijing Fu, Redmond, WA (US); Hee Yoon Lee, Redmond, WA (US); James Ronald Bonar, Erskine (GB); Pasi Saarikko, Kirkland, WA (US); Scott Charles McEldowney, Redmond, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 80 days.

(21) Appl. No.: 15/650,612

(22) Filed: Jul. 14, 2017

Related U.S. Application Data (60) Provisional application No. 62/529,776, filed on Jul. 7, 2017.

(51) Int. Cl.
*G02B 27/01* (2006.01)
*G02B 26/08* (2006.01)
(Continued)

(52) U.S. Cl.
CPC .......... *G02B 27/0172* (2013.01); *G02B 1/02* (2013.01); *G02B 6/0006* (2013.01);
(Continued)

(58) Field of Classification Search
CPC .............. G02B 27/0172; G02B 27/141; H04N 9/3135; H04N 9/317; H04N 9/3161; H04N 9/3164
See application file for complete search history.

(56) References Cited

U.S. PATENT DOCUMENTS

| | | | |
|---|---|---|---|
| 7,034,271 B1* | 4/2006 | Sinclair | G02B 21/0016 250/201.3 |
| 2009/0190131 A1* | 7/2009 | Gollier | G01B 11/272 356/400 |

(Continued)

OTHER PUBLICATIONS

"Coherence (physics)," Wikipedia, Last Updated May 18, 2017, 12 pages, May be retrieved at <URL:https://en.wikipedia.org/w/index.php?title=Coherence_(physics)&oldid=7810681 58>.
Hofmann, U. et al., "Wafer Level Vacuum Packaged Two-Axis MEMS Scanning Mirror for Pico Projector Application," MOEMS and Miniaturized Systems XIII, Proc. of SPIE, 2014, pp. 89770A-1-89770A-14, vol. 8977.
Holmström, S.T.S. et al., "MEMS Laser Scanners: A Review," Journal of Microelectromechanical Systems, Apr. 2014, pp. 259-275, vol. 23, No. 2.

(Continued)

*Primary Examiner* — Alexander Eisen
*Assistant Examiner* — Kebede T Teshome
(74) *Attorney, Agent, or Firm* — Morgan, Lewis & Bockius LLP (57) ABSTRACT

A waveguide display includes a source assembly, an output waveguide, and a controller. The source assembly includes a light source and an optics system. The light source includes source elements arranged in a 1D or 2D array that emit image light that is temporally incoherent and spatially coherent. In some embodiments, the light source includes an array of superluminous LEDs, an array of laser diodes, an array of resonant cavity LEDs, or some combination thereof. The optics system includes a scanning assembly that scans the image light to particular locations based on scanning instructions. The output waveguide receives the scanned image light from the scanning assembly and outputs an expanded image light. The controller generates the scanning instructions and provides the scanning instructions to the light source.

21 Claims, 6 Drawing Sheets

(51) Int. Cl.
  *G02B 1/02* (2006.01)
  *F21V 8/00* (2006.01)
  *G02B 27/14* (2006.01)
  *H04N 9/31* (2006.01)

(52) U.S. Cl.
  CPC ....... *G02B 26/0833* (2013.01); *G02B 27/141* (2013.01); *H04N 9/312* (2013.01); *H04N 9/317* (2013.01); *H04N 9/3135* (2013.01); *H04N 9/3161* (2013.01); *H04N 9/3164* (2013.01); *G02B 2027/0123* (2013.01); *G02B 2027/0178* (2013.01)

(56) References Cited

U.S. PATENT DOCUMENTS

| | | | |
|---|---|---|---|
| 2013/0222384 A1* | 8/2013 | Futterer | G02B 5/32 345/426 |
| 2015/0055090 A1* | 2/2015 | Cense | A61B 3/102 351/206 |

OTHER PUBLICATIONS

Sasaki, M. et al, "Optically Flat Micromirror Using Stretched Membrane with Crystallization-Induced Stress," IEEE, 2007, pp. 27-28.

* cited by examiner

TEMPORALLY INCOHERENT AND SPATIALLY COHERENT SOURCE FOR WAVEGUIDE DISPLAYS

CROSS REFERENCE TO RELATED APPLICATIONS

This application claims the benefit of U.S. Provisional Application No. 62/529,776, filed Jul. 7, 2017, which is incorporated by reference in its entirety.

BACKGROUND

This disclosure relates generally to near-eye-displays, and in particular, to sources for waveguide displays.

Some factors considered for design of conventional displays are brightness, resolution, field of view, and compactness. In augmented reality (AR) applications using next generation displays, a wider band light source is preferred over a single wavelength laser for certain architectures. Even though the lasers used for such displays generate light with very high spatial coherency (i.e. a collimated beam of light) along with a narrow spectrum, the temporal coherence of conventional lasers is unsuitable for achieving good image quality with pupil replication in near-eye-displays. For example, sources with both high temporal coherence and high spatial coherence tend to destroy homogeneity of light after pupil expansion in a near-eye display, and cause a reduction in image fidelity.

Accordingly, the conventional display designs in certain near-eye-display architectures often lack light sources that generate an image light with very high image fidelity.

SUMMARY

A waveguide display is used as part of a virtual reality (VR) system, an augmented reality (AR) system, a mixed reality (MR) system, or some combination thereof. In some embodiments, the waveguide display may be included in a near-eye display. The near eye display includes a display assembly that presents media to a user's eyes. The display assembly includes a light source assembly, an output waveguide, and a controller. The light source assembly includes a light source and an optics system. The light source emits an image light that is spatially coherent (e.g., divergence angle less than 2 arcminutes as it couples to the output waveguide) and temporally incoherent (e.g., coherence length in the range of 20 to 200 micron for source emitting light in a visible band). The optics system directs the image light to the output waveguide. In some embodiments, the optics system includes a combining assembly and a scanning assembly. The scanning assembly may include one or more mirrors, one or more fibers or some combination thereof. In some configurations, the scanning assembly includes microelectromechanical scanning mirrors that resonantly oscillate along two orthogonal axes with a resonant oscillation frequency along each of the two orthogonal axes in the range of 20 kHz to 50 kHz.

The output waveguide expands the scanned image light from the optics system and outputs the expanded image light to an eye box. In some embodiments, the light source is a spatially coherent and temporally incoherent light source consisting of source elements such as an array of superluminescent light emitting diodes (SLEDs), an array of light emitting diodes (LEDs), an array of laser diodes, an array of resonant cavity light emitting diodes, or some combination thereof. The controller generates scanning instructions to the light source which outputs the image light toward the output waveguide.

The light source includes one or more source elements (e.g., SLEDs). The one or more source elements may emit image light in the same wavelength range (e.g., all emit the same color). Alternatively, some source elements may emit image light at different wavelength ranges than other source elements (e.g., one source emits in red, another emits in blue, and another emits in green). In some embodiments, the plurality of source elements forms an array. In some embodiments, the array is one dimensional, linear array of source elements. Alternatively, the array may be a two-dimensional array of source elements (e.g., a sparse array).

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Figure 1:
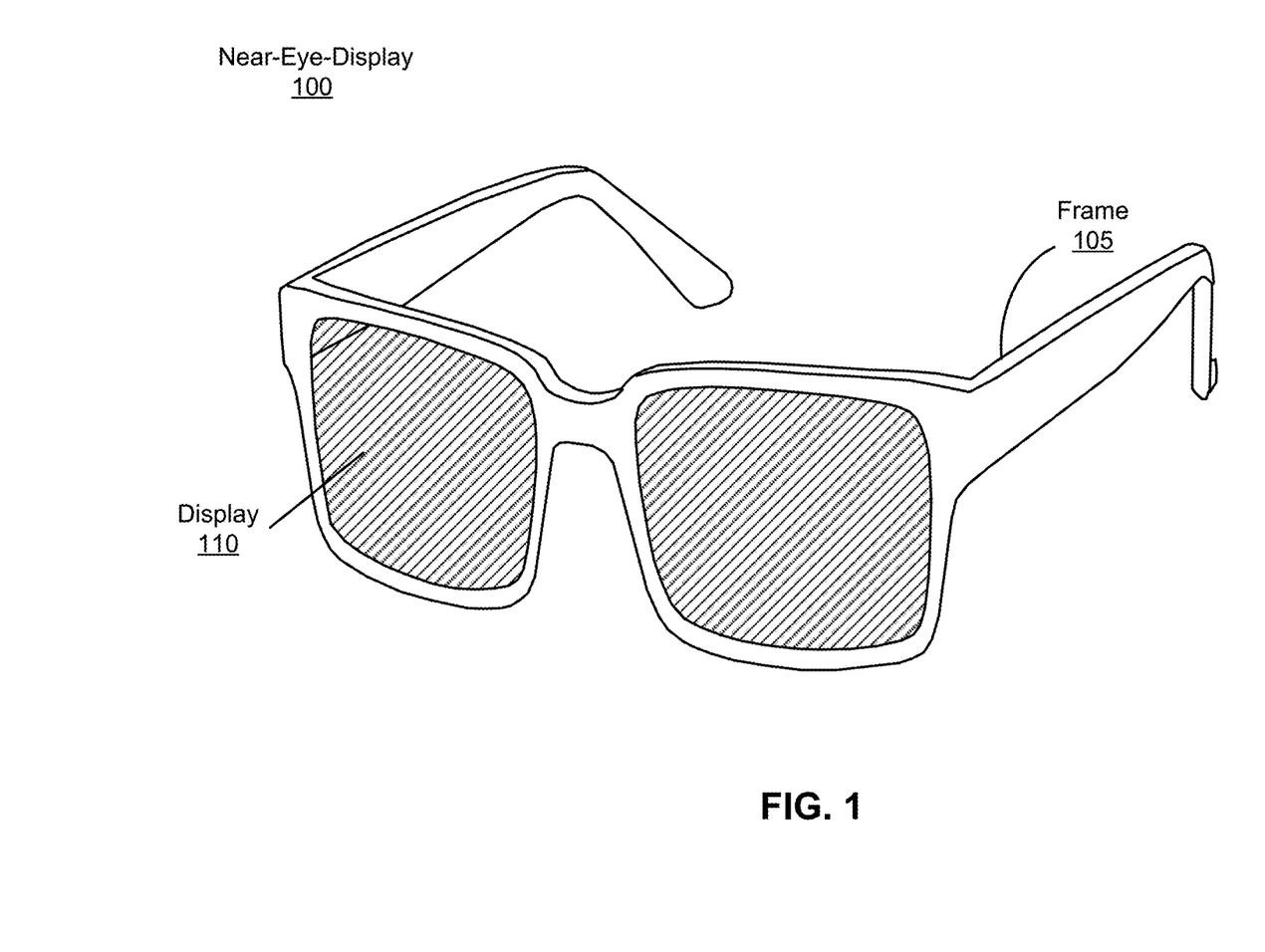
FIG. 1 is a diagram of a near-eye-display (NED), in accordance with an embodiment.

FIG. 1 is a diagram of a near-eye-display (NED) 100, in accordance with an embodiment. The NED 100 presents media to a user. Examples of media presented by the NED 100 include one or more images, video, audio, or some combination thereof. In some embodiments, audio is presented via an external device (e.g., speakers and/or headphones) that receives audio information from the NED 100, a console (not shown), or both, and presents audio data based on the audio information. The NED 100 is generally configured to operate as an AR NED. However, in some embodiments, the NED 100 may be modified to also operate as a virtual reality (VR) NED, a mixed reality (MR) NED, or some combination thereof. For example, in some embodiments, the NED 100 may augment views of a physical, real-world environment with computer-generated elements (e.g., images, video, sound, etc.).

The NED 100 shown in FIG. 1 includes a frame 105 and a display 110. The frame 105 includes one or more optical elements which together display media to users. The display 110 is configured for users to see the content presented by the NED 100. As discussed below in conjunction with FIG. 2, the display 110 includes at least one source assembly to generate an image light that is spatially coherent and temporally incoherent to present media to an eye of the user. The source assembly includes, e.g., a source, an optics system, or some combination thereof.

FIG. 1 is only an example of an AR NED. However, in alternate embodiments, FIG. 1 may also be referred to as a Head-Mounted-Display (HMD).

Figure 2:
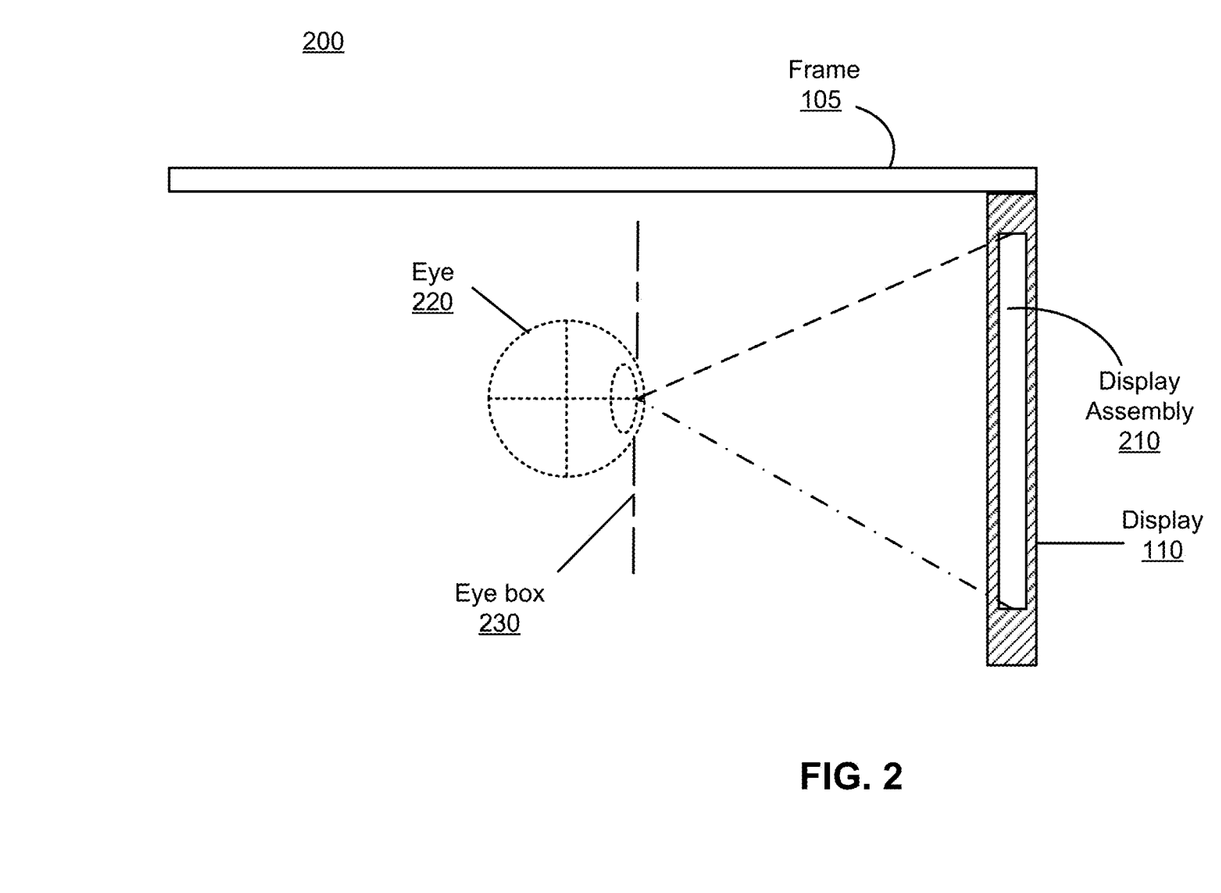
FIG. 2 is a cross-section of an eyewear of the NED illustrated in FIG. 1, in accordance with an embodiment.

FIG. 2 is a cross section 200 of the NED 100 illustrated in FIG. 1, in accordance with an embodiment. The cross section 200 includes at least one display assembly 210, and an eye box 230. The eye box 230 is a location where the eye 220 is positioned when the user wears the NED 100. In some embodiments, the frame 105 may represent a frame of eye-wear glasses. For purposes of illustration, FIG. 2 shows the cross section 200 associated with a single eye 220 and a single display assembly 210, but in alternative embodiments not shown, another display assembly which is separate from the display assembly 210 shown in FIG. 2, provides image light to another eye 220 of the user.

The display assembly 210, as illustrated below in FIG. 2, is configured to direct the image light to the eye box 230. The display assembly 210 includes a waveguide display, as described below with reference to FIG. 3. The waveguide display includes a source assembly that generates an image light that is spatially coherent and temporally incoherent to present media to user's eyes. The spatial coherence of the image light generated by the source assembly describes, when averaged over time, an ability of any two points in space in the extent of the image light to interfere. For example, when the spatially coherent image light has a single amplitude and phase over an infinite volume of space, the image light has an infinitesimally small value of a divergence angle when coupled into an external system. The temporal coherence of the image light is a measure of an average correlation between a phase or amplitude of the image light and the image light delayed by a coherence time. The coherence length of the image light is a measure of the distance traveled by the image light in the coherence time.

The display assembly 210 may be composed of one or more materials (e.g., plastic, glass, etc.) with one or more refractive indices that effectively minimize the weight and widen a field of view (hereinafter abbreviated as 'FOV') of the NED 100. In alternate configurations, the NED 100 includes one or more optical elements between the display assembly 210 and the eye 220. The optical elements may act to, e.g., correct aberrations in image light emitted from the display assembly 210, magnify image light emitted from the display assembly 210, some other optical adjustment of image light emitted from the display assembly 210, or some combination thereof. The example for optical elements may include an aperture, a Fresnel lens, a convex lens, a concave lens, a liquid lens, a filter, an electrically switchable liquid crystal grating, or any other suitable optical element that affects image light.

Figure 3:
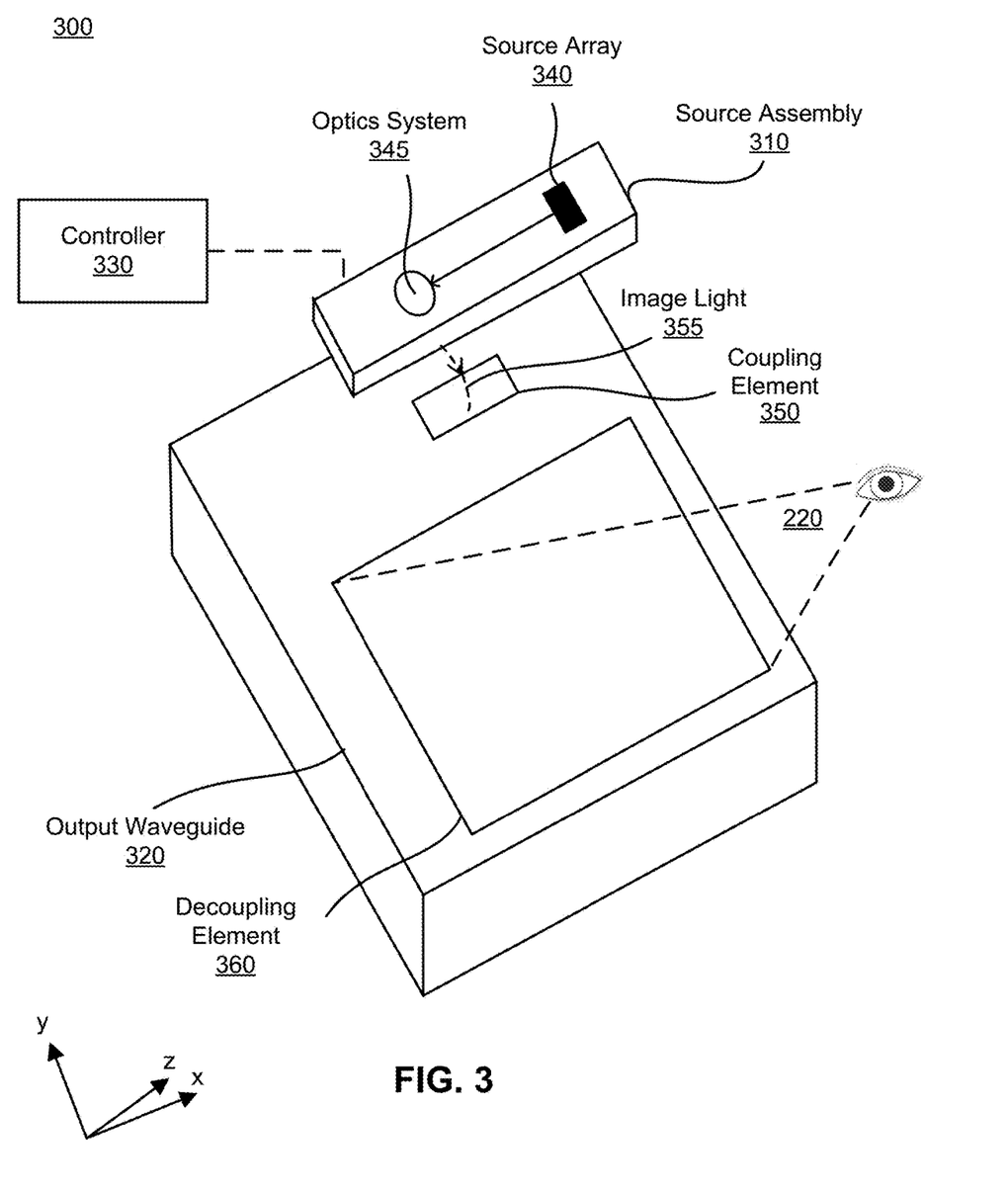
FIG. 3 illustrates an isometric view of a waveguide display, in accordance with an embodiment.

FIG. 3 illustrates an isometric view of a waveguide display 300, in accordance with an embodiment. In some embodiments, the waveguide display 300 (may also be referred to as a scanning waveguide display) is a component (e.g., display assembly 210) of the NED 100. In alternate embodiments, the waveguide display 300 is part of some other NED, or other system that directs display image light to a particular location.

The waveguide display 300 includes a source assembly 310, an output waveguide 320, and a controller 330. For purposes of illustration, FIG. 3 shows the waveguide display 300 associated with a single eye 220, but in some embodiments, another waveguide display separate (or partially separate) from the waveguide display 300, provides image light to another eye of the user. In a partially separate system, one or more components may be shared between waveguide displays for each eye.

The source assembly 310 generates image light. The source assembly 310 includes a source array 340 and an optics system 345 (e.g., as further described below with regard to FIG. 4). The source array 340 is an optical component that generates image light that is temporally incoherent and spatially coherent. The source array 340 generates an image light including, but not restricted to, an image light with a first band of wavelengths in the range of 620 to 700 nm, an image light with a second band of wavelengths in the range of 495 to 570 nm, an image light with a third band of wavelengths in the range of 450 to 495 nm, etc. The source array 340 generates a spatially coherent image light with a threshold value of a divergence angle required for high irradiance. In one example, the threshold value of divergence angle is 2 arcminutes as the image light couples to the output waveguide 320. The source array 340 also generates a temporally incoherent image light with a coherence length over which the image light maintains a specified degree of coherence. In one example, the coherence length of the source array 340 is in the range of 20 to 200 micron. In some configurations, the source array 340 generates a first image light corresponding to a first band of wavelengths and a second image light corresponding to a second band of wavelengths.

The optics system 345 performs a set of optical processes including, e.g., focusing, combining, conditioning, and scanning processes on the image light generated by the source array 340. In some embodiments (not illustrated), the optics system 345 includes a combining assembly, a light conditioning assembly, and a scanning-assembly, as described below in detail in conjunction with FIG. 4. The source assembly 310 generates and outputs an image light 355 to a coupling element 350 of the output waveguide 320.

The output waveguide 320 is an optical waveguide that outputs image light to an eye 220 of a user. The output waveguide 320 receives the image light 355 at one or more coupling elements 350 with a spatial coherence corresponding to a divergence angle of at most two arcminutes, and guides the received input image light to one or more decoupling elements 360. In some embodiments, the coupling element 350 couples the image light 355 from the source assembly 310 into the output waveguide 320. The coupling element 350 may be, e.g., a diffraction grating, a holographic grating, some other element that couples the image light 355 into the output waveguide 320, or some combination thereof. For example, in embodiments where the coupling element 350 is diffraction grating, the pitch of the diffraction grating is chosen such that total internal reflection occurs, and the image light 355 propagates internally toward the decoupling element 360. For example, the pitch of the diffraction grating may be in the range of 300 nm to 600 nm.

The decoupling element 360 decouples the total internally reflected image light from the output waveguide 320. The decoupling element 360 may be, e.g., a diffraction grating, a holographic grating, some other element that decouples image light out of the output waveguide 320, or some combination thereof. For example, in embodiments where the decoupling element 360 is a diffraction grating, the pitch of the diffraction grating is chosen to cause incident image light to exit the output waveguide 320. For example, the pitch of the diffraction grating may be in the range of 300 nm to 600 nm. An orientation and position of the image light exiting from the output waveguide 320 is controlled by changing an orientation and position of the image light 355 entering the coupling element 350.

The output waveguide 320 may be composed of one or more materials that facilitate total internal reflection of the image light 355. The output waveguide 320 may be composed of e.g., silicon, plastic, glass, or polymers, or some combination thereof. In some configurations, the output waveguide 320 has an index of refraction of at least 1.5. The output waveguide 320 has a relatively small form factor. For example, the output waveguide 320 may be approximately 50 mm wide along X-dimension, 30 mm long along Y-dimension and 0.1-0.8 mm thick along Z-dimension. The output waveguide 320 is associated with an optical path length between pupil replications in the range of 400 microns to 3.2 mm. For a given input angle of the image light 355 onto the coupling element 350 of the output waveguide 320, there is a corresponding propagation angle of a totally internally reflected light (not shown here), where the relationship between the input angle and the propagation angle is determined by the coupling element 350. When the image light 355 reaches the decoupling element 360, each bounce off of the decoupling element 360 results in pupil replication outputted from the output waveguide 320. The internal propagation angle ($\theta$, from the surface normal), the index of refraction of the output waveguide 320 (n), and the thickness ($\tau$) of the output waveguide 320 defines the optical path length between pupil replications via:

Optical path length between pupil replications=$2n\tau/\cos(\theta)$

The controller 330 controls the scanning operations of the source array 340 and the optics system 345. The controller 330 determines scanning instructions for the source array 340 based at least on the one or more display instructions. Display instructions are instructions to render one or more images. In some embodiments, display instructions may simply be an image file (e.g., bitmap). The display instructions may be received from, e.g., a console of a VR system (not shown here). Scanning instructions are instructions used by the source assembly 310 to generate image light 355 that is spatially coherent and temporally incoherent relative to the optical path length between pupil replications of the output waveguide 320. The scanning instructions may include, e.g., a type of a source of image light (e.g. monochromatic, polychromatic), a threshold value for divergence angle, a range of coherence lengths, a scanning rate, an orientation of a scanning apparatus, one or more illumination parameters (described below with reference to FIG. 4), or some combination thereof. The controller 330 includes a combination of hardware, software, and/or firmware not shown here so as not to obscure other aspects of the disclosure.

Figure 4:
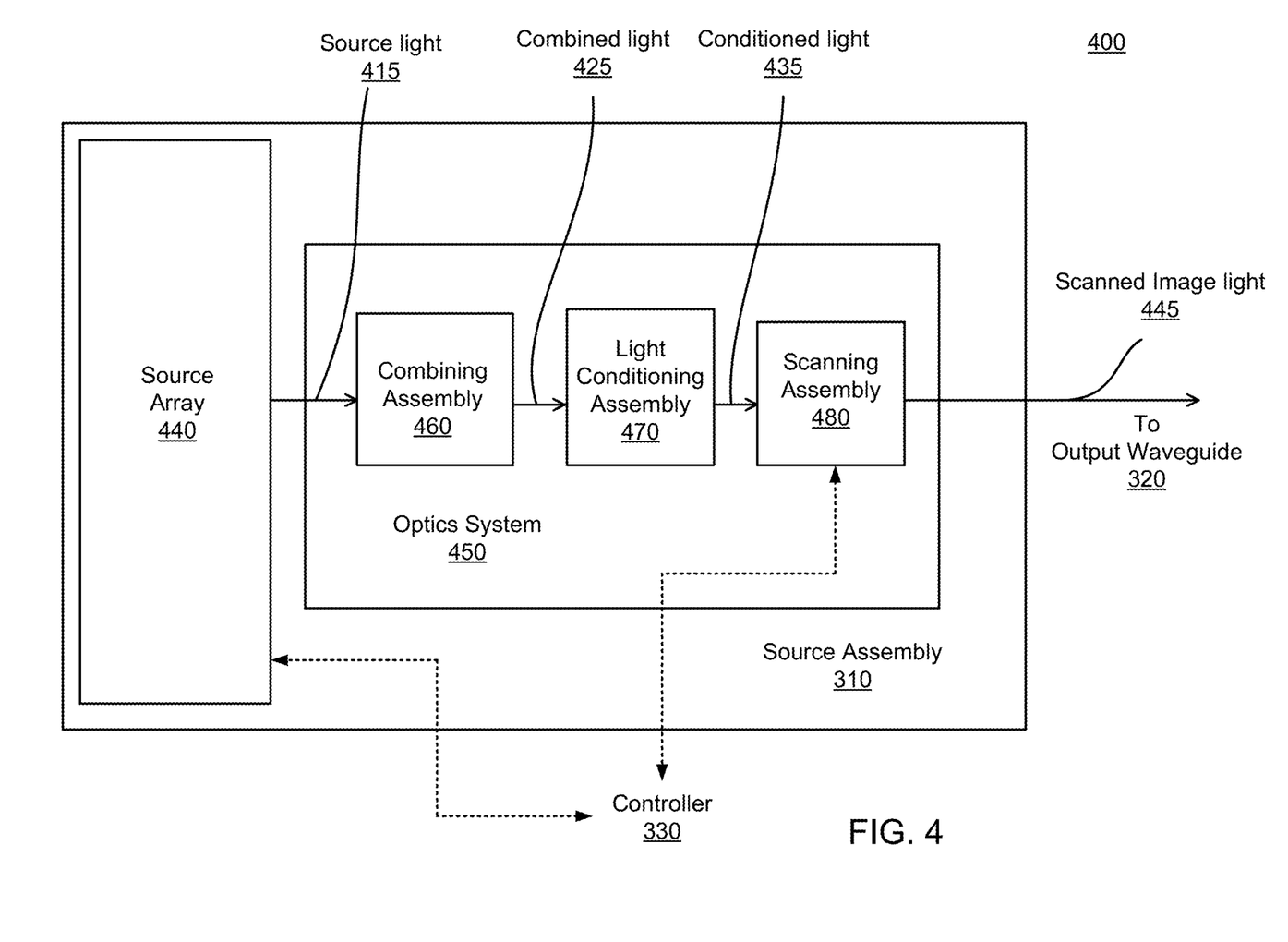
FIG. 4 illustrates a block diagram of a source assembly with a light source, the source assembly outputting a scanned light, in accordance with an embodiment.

FIG. 4 illustrates a cross section 400 of the source assembly 310, in accordance with an embodiment. The cross section 400 of the source assembly 310 includes a source array 440 and an optics system 450. The source array 440 is an embodiment of the source array 340 of FIG. 3. In some configurations, the source array 440 includes red, green and blue temporally incoherent light sources. The optics system 450 is an embodiment of the optics system 345 of FIG. 3.

The source assembly 310 generates light in accordance with scanning instructions from the controller 330. The source assembly 310 includes a source array 440, and an optics system 450. The source array 440 is a source of light that generates a temporally incoherent and spatially coherent image light. The source array 440 may be, e.g., a superluminous LED, a laser diode, a vertical cavity surface emitting laser (VCSEL), a light emitting diode, a tunable laser, or some other light source that emits temporally incoherent and spatially coherent light. The source array 440 emits light in a visible band (e.g., from about 390 nm to 700 nm), and it may emit light that is continuous or pulsed. In some embodiments, the source array 440 may be a superluminous LED (SLED) array of densely packed ridge waveguides with a wide emission spectrum. The source array 440 emits light in accordance with one or more illumination parameters received from the controller 330. An illumination parameter is an instruction used by the source array 440 to generate light. An illumination parameter may include, e.g., source wavelength, pulse rate, pulse amplitude, beam type (continuous or pulsed), other parameter(s) that affect the emitted light, or some combination thereof.

In some embodiments, the source array 440 includes an array of laser diodes which emit image lights with one or more wavelengths separated by a threshold value to cover a desired width of spectrum. In one example, the source array 440 emits image lights with wavelengths separated by a threshold value of around 1 nm to cover a spectrum with a width in the range of 2 to 10 nm.

In alternate embodiments, the source array 440 includes an array of resonant cavity light emitting diodes (RCLED) which emit image light with a threshold value of spectral purity and emission intensity. In each of the RCLED, the active region of the RCLED is located inside a high finesse optical cavity resulting in a restriction of the spontaneous emission from the active region only to the optical modes of the resonant cavity with a typical RCLED having a spectral bandwidth of 10 nm when operating at 650 nm. The source array 440 may be associated with an emission intensity in the range of 10-50 mW.

The source array 440 is a source of light that generates a spatially coherent and temporally incoherent image light. The source array 440 includes one or more source elements (not shown here). In one example, the source array 440 is a one-dimensional linear array of SLEDS, where each SLED corresponds to a respective row in an image ultimately displayed to the user. In one embodiment, the source array 440 includes a plurality of ridge waveguides with a constant pixel pitch between each of the ridge waveguides.

The source array 440 emits a source light 415. In some embodiments, the source light 415 includes a red image light, a green image light, a blue image light, an infra-red image light, or some combination thereof. In another embodiment, the source light 415 includes an infrared light.

The optics system 450 includes one or more optical components that condition the light from the source array 440. Conditioning light from the source array 440 may include, e.g., expanding, collimating, adjusting orientation in accordance with instructions from the controller 330, some other adjustment of the light, or some combination thereof. The one or more optical components may include, e.g., lenses, mirrors, apertures, gratings, electrically switchable liquid crystal gratings, or some combination thereof. Light emitted from the optics system 450 (and also the source assembly 310) is referred to as scanned image light 445. The optics system 450 outputs the scanned image light 445 at a particular orientation (in accordance with the scanning instructions) toward the output waveguide 320.

The optics system 450 includes a combining assembly 460, a light conditioning assembly 470, and a scanning assembly 480. The combining assembly 460 combines the source light 415 outputted by the source array 440 and transmits a combined light 425 to the light conditioning assembly 470.

In some embodiments, the combining assembly 460 includes a plurality of dichroic mirrors (not shown here). Each of the mirrors have a respective transmission passband and respective reflection passband. A transmission passband is a band of wavelengths within which the plurality of dichroic mirrors transmits an incident light. A reflection passband is a band of wavelengths within which the plurality of dichroic mirrors reflects an incident light. A first light from the source array 440 is transmitted by a first dichroic mirror. A second light from the source array 440 is reflected by a second dichroic mirror such that it creates a partially combined light (not shown here). The partially combined light is transmitted by the second dichroic mirror. And a third light from the source array 440 is reflected by the first dichroic mirror such that the third light combines with the partially combined light to form the combined light 425.

In alternate embodiments, the combining assembly 460 is a fiber array that includes one or more optical fibers configured to direct an image light from the combining assembly 460. The fiber array includes one or more optical fibers that combines one or more beams of colored image light (e.g. Red, Green, and Blue) into a single fiber via dichroic mirrors and a lens system. In some configurations, an end of a single optical fiber that is at the NED 100 would form an assembly with the lens system and the whole assembly may be scanned. In alternate configurations, a fiber tip of the optical fiber may be scanned with respect to a fixed lens of the lens system. The fiber array is selected from a group comprising: a single-mode fiber array, a polarization maintaining fiber array, a multi-mode fiber array, or some combination thereof. In some embodiments, the fiber array includes at least one-dimensional fiber array with a spacing of 100 microns to 1 millimeter between the fibers. The combining assembly 460 includes one or more fibers (not shown here).

The light conditioning assembly 470 conditions the combined light 425 and emits a conditioned light 435 to the scanning assembly 480. The conditioned light 435 is a light conditioned for incidence on the scanning assembly 480. The light conditioning assembly 470 includes one or more optical components that condition the light from the source array 440. Conditioning light from the source array 440 may include, e.g., expanding, collimating, correcting for one or more optical errors (e.g., field curvature, chromatic aberration, etc.), some other adjustment of the light, or some combination thereof. The light conditioning assembly 470 conditions the source light 415 and emits the conditioned light 435 to the scanning assembly 480.

The scanning assembly 480 includes one or more optical elements that redirect image light via one or more reflective portions of the scanning assembly 480. Where the image light is redirected toward is based on specific orientations of the one or more reflective portions. In some embodiments, the scanning assembly 480 includes a single scanning mirror that is configured to scan in at least two dimensions. In other embodiments, the scanning assembly 480 may include a plurality of scanning mirrors that each scan in orthogonal directions to each other. The scanning assembly 480 may raster scan (horizontally, or vertically). In some embodiments, the scanning assembly 480 may perform a controlled vibration along the horizontal and/or vertical directions with a specific frequency of oscillation to scan along two dimensions and generate a two-dimensional projected line image of the media presented to user's eyes. In one example, the scanning assembly 480 generates "Lisajous" or "Bowditch" curves based on the controlled scanning along two dimensions. The scanning assembly 480 emits the scanned image light 445 based on the conditioned light 435.

In some embodiments, the scanning assembly 480 includes a galvanometer mirror. For example, the galvanometer mirror may represent any electromechanical instrument that indicates that it has sensed an electric current by deflecting a beam of image light with one or more mirrors. The galvanometer mirror may be configured to scan in at least one orthogonal dimension to generate the scanned image light 445. The scanned image light 445 from the galvanometer mirror represents a two-dimensional line image of the media presented to user's eyes.

The scanning assembly 480 performs an array translation of pixel positions to achieve a desired frame rate in accordance with the source light 415 outputted by the source array 440. For example, the scanning assembly 480 moves by one pixel position from a first instance of time to a second instance of time based on the desired level of brightness from the given number of pixel positions of the source array 440. In another example, the scanning assembly 480 performs an overlaying of RGB pixels with a time delay shorter than the response time of a human eye to direct a full colored image light. In some configurations, the scanning assembly 480 includes at least one two-dimensional MEMS mirror that performs a scanning of the conditioned light 435 with a reduced bandwidth. In typical scanning mirror assemblies which do not perform the array translation, the bandwidth required could be as high as 50-100 kHz. In contrast, the scanning assembly 480 performs the scanning with a bandwidth based on the number source elements in the source array 440. For example, when the source array 440 includes three source elements emitting a red image light, the bandwidth of the scanning assembly 480 is less than 20 kHz. In another example, the scanning assembly 480 includes a two-dimensional MEMS mirror performing a scanning with a bandwidth of 20 kHz.

The controller 330 controls the source array 440 and the scanning assembly 480. The controller 330 takes content for display, and divides the content into discrete sections. The controller 330 instructs the source array 440 to sequentially present the discrete sections using individual source elements corresponding to a respective row in an image ultimately displayed to the user. The controller 330 instructs the scanning assembly 480 to scan the presented discrete sections to different areas of a coupling element of the output waveguide 320. In some configurations, the controller 330 determines the angular position (e.g. angle of a mirror or fiber) of the scanning assembly 480. The controller 330 combines the angular position information with an image data from a video feed to generate the scanning instructions for the instructions for the source array 440. Accordingly, at the exit pupil of the output waveguide 320, each discrete portion is presented in a different location. While each discrete section is presented at different times, the presentation and scanning of the discrete sections occurs fast enough such that a user's eye integrates the different sections into a single image or series of images. The controller 330 may also provide scanning instructions to the source array 440 that include an address corresponding to an individual source element of the source array 440 and/or an electrical bias applied to the individual source element.

The scanned image light 445 is an embodiment of the image light 355 of FIG. 3. The scanned image light 445 couples to the output waveguide 320 as described above with reference to FIG. 3.

In some embodiments, the source array 440 includes source elements associated with light intensities that are modulated in time at a bandwidth in the range of 50 MHz to 500 MHz when the scanning assembly 480 performs a scanning in order to display an image. The source array 440 emits one or more beams of the source light 415 such that the far-field divergence angle is less than 5 arcminutes. The source array 440 emits the source light 415 containing at least three colors, having central wavelengths in the range of 440 nm to 480 nm, 510 nm to 540 nm, and 600 nm to 650 nm.

Figure 5:
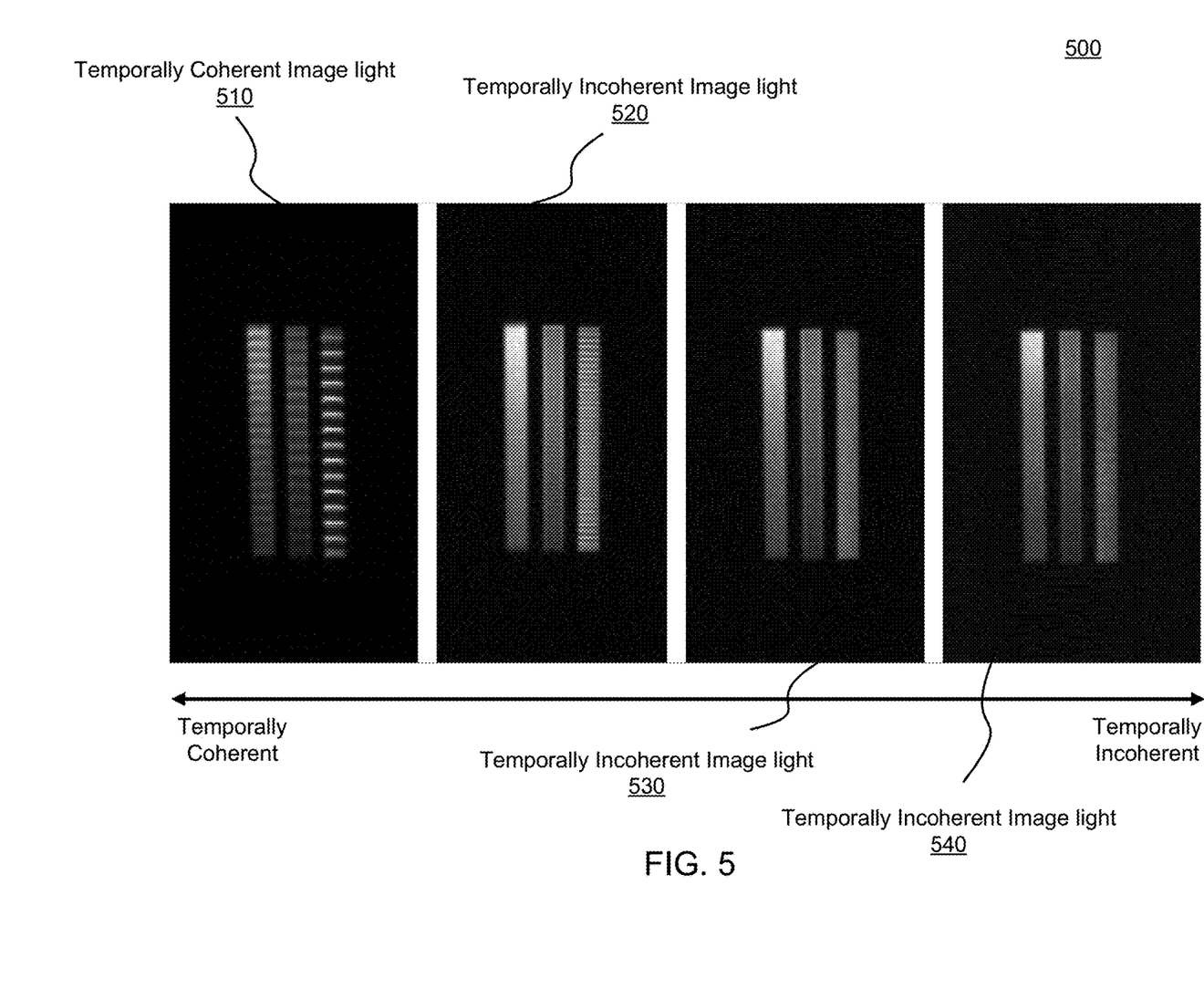
FIG. 5 is an illustration depicting how image artifacts increase with temporal coherence, in accordance with an embodiment.

FIG. 5 is an illustration 500 depicting how image artifacts increase with temporal coherence, in accordance with an embodiment. The temporally coherent image light 510 is an image light emitted by a light source with the coherence length of the light source relatively larger than the optical path length between pupil replications of the output waveguide 320, as described above with reference to FIG. 3. For example, the temporally coherent image light 510 has a coherence length of 200 microns and the optical path length between pupil replications of the output waveguide 320 is 100 microns. The temporally coherent image light 510 is associated with a relatively large amount of artifacts in the image due to the coherent interference between neighboring source elements of the light source. Accordingly, when the temporally coherent image light 510 is directed to the eye box 230, an image presented to the user's eye degrades in image fidelity. Each of the temporally incoherent image light 520, the temporally incoherent image light 530 and the temporally incoherent image light 540 is an image light emitted by a light source with the coherence length relatively smaller than the optical path length between pupil replications of the output waveguide 320 and a FWHM spectral linewidth of 5 nm. In one example, with a fixed value of the coherence length, the temporally incoherent image light 520 corresponds to the case where the optical path length between pupil replications of the output waveguide 320 is 200 microns, the temporally incoherent image light 530 corresponds to the case where the optical path length between pupil replications of the output waveguide 320 is 400 microns, and the temporally incoherent image light 540 corresponds to the case where the optical path length between pupil replications of the output waveguide 320 is 600 microns. As shown in FIG. 5, visibility of artifacts in the image due to coherent interference progressively decreases from the temporally coherent image light 510 to the temporally incoherent image light 530, and visibility of the artifacts in the temporally incoherent image light 540 is greatly reduced (to the point where they may not be visible to a user). Accordingly, use of a spatially coherent and temporally incoherent source can greatly improve user experiences with a NED, for at least the reason of improved image quality.

Figure 6A:
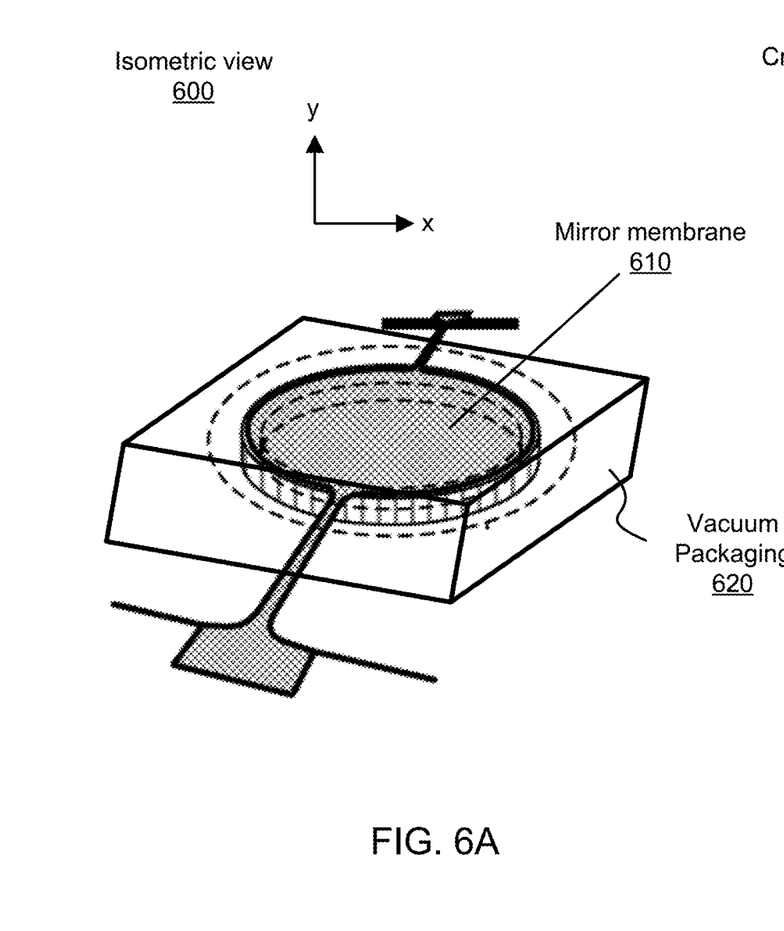
FIG. 6A is an isometric view of a MEMS mirror in the source assembly of FIG. 3, in accordance with an embodiment.

FIG. 6A is an isometric view of a MEMS mirror 600 in the source assembly 310 of FIG. 3, in accordance with an embodiment. The MEMS mirror 600 includes a mirror membrane 610 that is enclosed in a vacuum packaging 620.

The mirror membrane 610 is an optical component that directs a spatially coherent and temporally incoherent image light to any arbitrary direction. In some configurations, the mirror membrane 610 resonantly oscillates about two orthogonal axes (e.g. X-axis and Y-axis). The mirror membrane 610 is made of one or more materials, including but not restricted to, silicon, silicon di-oxide, amorphous silicon, polysilicon, aluminum, etc.

The vacuum packaging 620 is a layer that encloses the mirror membrane 610. In some configurations, the vacuum packaging 620 includes a hot glass formed on the mirror membrane 610 to hold the MEMS mirror 600 under a vacuum pressure of at most 10 mbar. The vacuum packaging 620 isolates the mirror membrane 610 from any external damping and results in a higher field of view (FOV) for a NED system. In one example, the vacuum packaging 620 allows the MEMS mirror 600 to provide a diagonal FOV of at least 60 degrees. The vacuum packaging 620 results in a relatively lower damping force on the MEMS mirror 600 when compared to conventional MEMS mirrors. The MEMS mirror 600 operates on a torsional resonance which is damped by air surrounding the MEMS mirror 600, thereby suppressing the amplitude of oscillation and broadening the torsional resonance. In some configurations, operating the MEMS mirror 600 under vacuum increases the mechanical oscillation amplitude by up to 10 times.

Figure 6B:
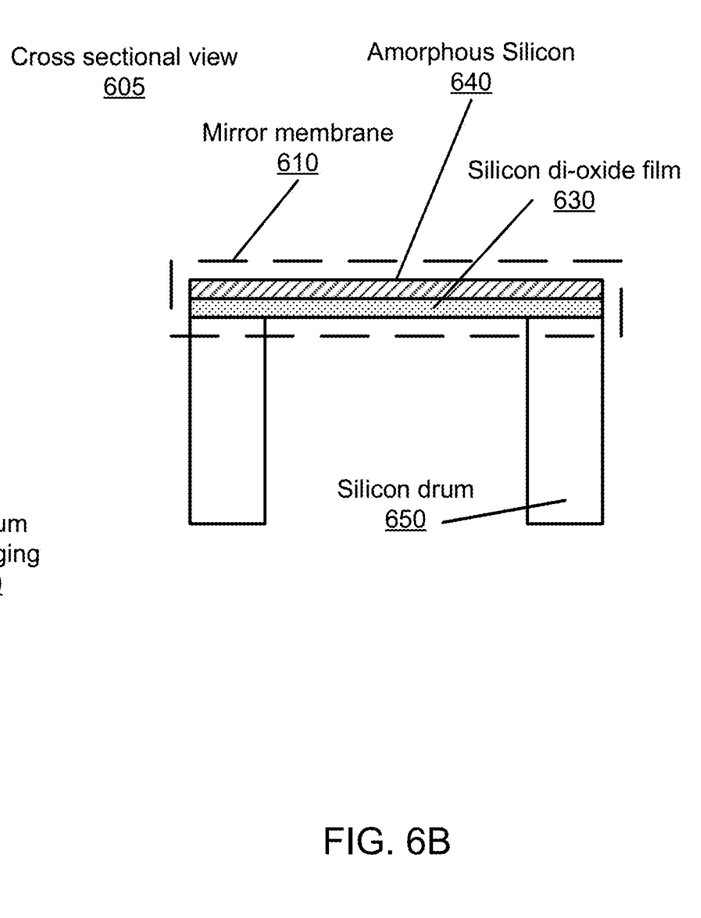
FIG. 6B is a cross sectional view of the MEMS mirror of FIG. 6A, in accordance with an embodiment.

FIG. 6B is a cross sectional view 605 of the MEMS mirror 600 of FIG. 6A, in accordance with an embodiment. In the embodiment of FIG. 6B, the mirror membrane 610 is formed by annealing one or more silicon-di-oxide films 630 and amorphous silicon 640 deposited on a silicon drum 650 resulting in a tensile stress of at least 400 mega pascal. Such a configuration minimizes the mirror mass of the MEMS mirror 600, and increases the torsional resonance frequency of the MEMS mirror 600, while creating a high tensile stress mirror membrane 610, and limiting the dynamic deformation of the MEMS mirror 600. The mirror membrane 610 oscillates with a resonance frequency of at least 20 kHz along one dimension (e.g. Y-axis).

In some configurations, the mirror membrane 610 may be mounted on a torsion spring structure associated with a mechanical resonance frequency. The mirror membrane 610 may be driven at the mechanical resonance frequency using an electrostatic comb drive and/or a piezoelectric actuator. In one example, the MEMS mirror 600 is associated with a mechanical resonance frequency along the X-axis and the Y-axis in the range of 20 kHz to 50 kHz. The MEMS mirror 600 may have a diameter of at least 0.8 mm. The MEMS mirror 600 may have a reflectivity of at least 70% in the wavelength range of 400 to 750 nm. The MEMS mirror 600 may have a dimension of 10 mm×10 mm×10 mm.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A waveguide display, comprising:
   a light source configured to emit image light in accordance with scanning instructions, the light source comprising a plurality of coherent source elements;
   a scanning assembly including one or more microelectromechanical (MEMS) scanning mirrors for scanning image light from the plurality of source elements and outputting the scanned image light to a target location, wherein the one or more MEMS scanning mirrors are configured to resonantly oscillate along two orthogonal axes;
   an output waveguide including an input area and an output area, the output waveguide configured to receive the scanned image light at the input area located in the target location, expand the scanned image light in at least one dimension to form expanded image light, and output the expanded image light from a portion of the output area to an eye box, the location of the portion of the output area based in part on a direction of the scanned image light received at the input area; and
   a controller configured to generate the scanning instructions and provide the scanning instructions to the light source,
   wherein a temporal incoherence of the expanded image light is based on an optical path length difference between pupil replications of the output waveguide.

2. The waveguide display of claim 1, wherein the plurality of source elements is selected from a group consisting of: a resonant cavity light-emitting diode, a laser diode, and a superluminescent light emitting diode.

3. The waveguide display of claim 1, wherein the image light is temporally incoherent and the temporal incoherence of the light source is selected based on a width of a spectrum of the light source.

4. The waveguide display of claim 1, wherein a divergence angle of the scanned image light being coupled into the input area of the output waveguide is less than a threshold value.

5. The waveguide display of claim 1, wherein a resonant oscillation frequency of the one or more microelectromechanical scanning mirrors along each of the two orthogonal axes is in the range of 20 kHz to 50 kHz.

6. The waveguide display of claim 1, wherein the one or more microelectromechanical scanning mirrors include a mirror plate formed from a polycrystalline membrane stretched under tension.

7. The waveguide display of claim 6, wherein the polycrystalline membrane is an amorphous silicon film subjected to a thermal annealing process to vary a tensile stress of the polycrystalline membrane.

8. The waveguide display of claim 1, wherein the plurality of source elements forms a one-dimensional array, and each source element corresponds to a line in an image output by the waveguide display.

9. The waveguide display of claim 1, wherein the plurality of source elements is placed in a sparse two-dimensional array, and each source element corresponds to a portion in an image output by the waveguide display.

10. The waveguide display of claim 9, wherein the sparse two-dimensional array comprises at least a first source element and a second source element, the first source element emits light at a first range of wavelengths, the second source element emits light at a second range of wavelengths that is different from the first range of wavelengths.

11. The waveguide display of claim 1, wherein the plurality of source elements is configured to emit light of the same wavelength.

12. The waveguide display of claim 1, wherein the plurality of source elements including at least one source element configured to emit light in a different range of wavelengths than another of the plurality of source elements.

13. The waveguide display of claim 1, further comprising:
   an optical fiber assembly configured to receive the emitted image light from the light source, the optical fiber assembly positioned at a threshold distance of separation from the light source.

14. A near-eye-display, comprising:
   a frame; and
   one or more displays coupled to the frame, each display comprising:
      a light source configured to emit image in accordance with scanning instructions, the light source comprising a plurality of coherent source elements;
      a scanning assembly including one or more microelectromechanical (MEMS) scanning mirrors for scanning light from a plurality of source elements using and outputting the scanned image light to a target location, wherein the one or more MEMS scanning mirrors are configured to resonantly oscillate along two orthogonal axes;
      an output waveguide including an input area and an output area, the output waveguide configured to receive the scanned image light at the input area located in the target location, expand the scanned image light in at least one dimension to form expanded image light, and output the expanded image light from a portion of the output area to an eye box, the location of the portion of the output area based in part on a direction of the scanned image light received at the input area; and a controller configured to generate the scanning instructions and provide the scanning instructions to the light source, wherein a temporal incoherence of the expanded image light is based on an optical path length difference between pupil replications of the output waveguide.

15. The near-eye-display of claim 14, wherein the plurality of source elements is selected from a group consisting of: a resonant cavity light-emitting diode, a laser diode, and a superluminescent light emitting diode.

16. The near-eye-display of claim 14, wherein the image light is temporally incoherent and the temporal incoherence of the light source is selected based a width of a spectrum of the light source.

17. The near-eye-display of claim 14, wherein a divergence angle of the scanned image light being coupled into the input area of the output waveguide is less than a threshold value.

18. The near-eye-display of claim 14, wherein a resonant oscillation frequency of the one or more microelectromechanical scanning mirrors along each of the two orthogonal axes is in the range of 20 kHz to 50 kHz.

19. The near-eye-display of claim 14, wherein the one or more microelectromechanical scanning mirrors include a mirror plate formed from a polycrystalline membrane stretched under tension.

20. The near-eye-display of claim 19, wherein the polycrystalline membrane is an amorphous silicon film subjected to a thermal annealing process to vary a tensile stress of the polycrystalline membrane.

21. The near-eye-display of claim 14, further comprising:

an optical fiber assembly configured to receive the emitted image light from the light source, the optical fiber assembly positioned at a threshold distance of separation from the light source.

* * * * *

UNITED STATES PATENT AND TRADEMARK OFFICE
CERTIFICATE OF CORRECTION

PATENT NO. : 10,705,341 B1
APPLICATION NO. : 15/650612
DATED : July 7, 2020
INVENTOR(S) : Parsons et al.

Page 1 of 1

It is certified that error appears in the above-identified patent and that said Letters Patent is hereby corrected as shown below:

In the Claims

Claim 16, Column 13, Line 18, please delete "based a width" and insert --based on a width--.

Signed and Sealed this
Eighth Day of September, 2020

Andrei Iancu
*Director of the United States Patent and Trademark Office*